United States Patent
Critsinelis et al.

(10) Patent No.: US 10,215,321 B2
(45) Date of Patent: Feb. 26, 2019

(54) SUBSEA FLOWLINE PRESSURE SURGE RELIEF SYSTEM

(71) Applicant: Chevron U.S.A. Inc., San Ramon, CA (US)

(72) Inventors: Antonio Critsinelis, Kingwood, TX (US); Sid Mebarkia, Sugar Land, TX (US); Meirong Huang, Katy, TX (US); Brady Lee Kirchof, Houston, TX (US); Lauren E. Reiners, Houston, TX (US); Baha T. Tanju, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 42 days.

(21) Appl. No.: 15/248,759

(22) Filed: Aug. 26, 2016

(65) Prior Publication Data

US 2018/0058620 A1 Mar. 1, 2018

(51) Int. Cl.
| F16L 55/05 | (2006.01) |
| F16L 55/055 | (2006.01) |
| E21B 43/01 | (2006.01) |
| F16L 57/00 | (2006.01) |
| G01L 1/00 | (2006.01) |

(52) U.S. Cl.
CPC .............. *F16L 55/05* (2013.01); *E21B 43/01* (2013.01); *F16L 55/055* (2013.01); *F16L 57/00* (2013.01); *G01L 1/00* (2013.01)

(58) Field of Classification Search
CPC ......... F16L 55/05; F16L 55/055; F16L 57/00; E21B 43/01
See application file for complete search history.

(56) References Cited

U.S. PATENT DOCUMENTS

| 8,235,628 | B2 | 8/2012 | Lamison | |
| 2004/0017105 | A1* | 1/2004 | Suzuki | B60T 13/148 |
| | | | | 303/116.2 |
| 2004/0149445 | A1* | 8/2004 | Appleford | E21B 43/01 |
| | | | | 166/357 |
| 2005/0139138 | A1* | 6/2005 | DeVries | E21B 37/06 |
| | | | | 114/256 |
| 2012/0160329 | A1* | 6/2012 | MacKenzie | E21B 43/01 |
| | | | | 137/1 |
| 2014/0261778 | A1 | 9/2014 | Hamilton | |

* cited by examiner

*Primary Examiner* — P. Macade Nichols
(74) *Attorney, Agent, or Firm* — Karen R. DiDomenicis (57) ABSTRACT

Disclosed are processes and systems for preventing overpressurization of piping transporting fluid produced from a pressure source to a receiving facility in which the fluid passes through a high integrity pressure protection system (HIPPS). A relief device is provided in the piping in fluid communication with the HIPPS. In the event that fluid passing through the HIPPS during the valve closure time period has a property exceeding an activation property, the relief device is activated thereby allowing the fluid passing through the HIPPS during the valve closure time period to flow to a fluid containment volume. The fluid containment volume has sufficient volume such that upon the start of the closure of the valve in response to the pressure surge, a portion of the fluid passing through the HIPPS during the valve closure time period is absorbed by the fluid containment volume thereby lessening pressure increase in the piping.

25 Claims, 12 Drawing Sheets

SUBSEA FLOWLINE PRESSURE SURGE RELIEF SYSTEM

FIELD

The present disclosure relates to subsea production equipment and flowlines, and methods for preventing overpressurization of subsea production equipment and flowlines.

BACKGROUND

High integrity pressure protection systems (HIPPS) are safety instrumented systems built according to the International Electrotechnical Commission's International Standards IEC 61508 entitled "Functional safety of electrical/electronic/programmable electronic safety-related systems" and IEC 61511 entitled "Functional safety—Safety instrumented systems for the process industry sector" and designed to protect equipment downstream of the HIPPS, personnel and the environment from an overpressurization event. Subsea HIPPS are used in offshore oil and gas production to mitigate the risk of subsea flowline pressures exceeding tolerable pressure. The protection against excessive pressure is obtained by quickly isolating the source of a large increase in pressure. HIPPS include valves such as block valves capable of quickly shutting off flow through the HIPPS, pressure sensors for detecting the pressure of fluid flowing through the HIPPS, actuators (pneumatic or hydraulic) for controlling the valves, and logic controllers for receiving information from the pressure sensors and sending signals to the actuators. HIPPS typically include redundant components for reliable operation. The term "HIPPS" is used throughout to refer to high integrity pressure protection systems, either in the singular or the plural. HIPPS have been used on topsides oil and gas production facilities for many years.

In the past several years, the use of HIPPS in subsea environments has become a viable option for a number of reasons. For one, in some cases, subsea equipment cannot be manufactured to the required pressure rating. In some situations, subsea flowline or pipeline having the required pressure rating cannot be installed using conventional installation techniques due to the wall thickness that would be required to withstand the maximum pressures encountered for a given oilfield. In the case of a long distance tie-back, a HIPPS may enable use of optimized wall thickness pipe designed for lower pressure than the shut-in pressure, with a significant cost benefit and reduction of offshore installation risks given the pipe length required. In the case of a new high pressure tie-in to existing subsea facilities, a HIPPS may be needed because the existing subsea facilities are rated for a significantly lower pressure than that of the new well or field. A HIPPS may also be called for when the cost of the HIPPS is lower than the cost of deploying pipeline at the required pressure rating or when a production facility without the HIPPS would be otherwise uneconomic.

Shut-in tubing pressure (SITP) is the maximum pressure that occurs during non-flowing conditions in a flowline system when exposed to full source pressure. Currently, typical subsea flowline systems have SITPs of less than 15,000 psi and design temperatures of less than 350° F. The technology qualification process for subsea production systems rated up to 20,000 psi is particularly lengthy and involved, as is the lead time for delivery of subsea equipment. Since operating pressure is generally much lower than SITP, a flowline system rated for SITP is inherently overdesigned for intended operating conditions.

Figure 1:
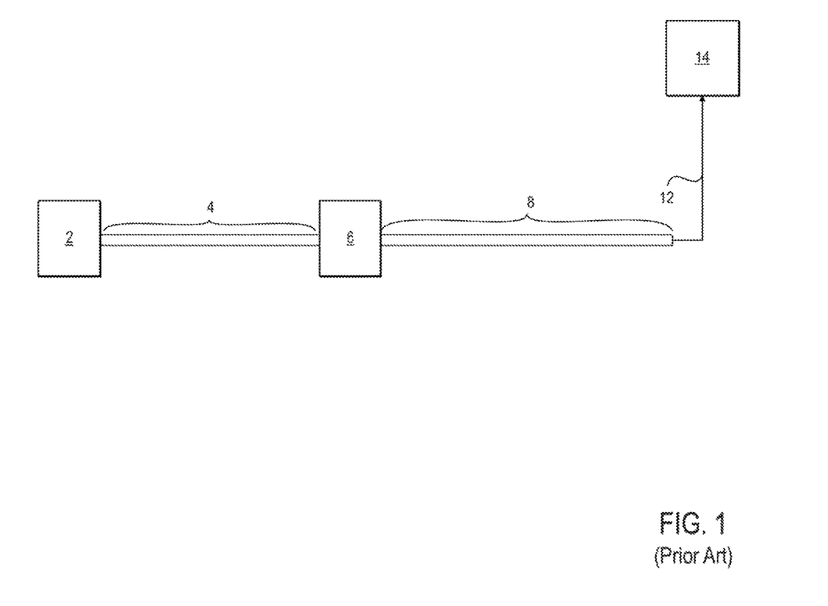
FIG. 1 is a schematic diagram illustrating an oil and gas production facility utilizing a high integrity pressure protection system according to the prior art.

FIG. 1 illustrates a prior art offshore oil and gas production facility including a drill center 2 having one or more subsea wells, a fully rated section of pipeline 4 connecting the drill center 2 to a HIPPS 6, a fortified section of pipeline 8 connected to the HIPPS 6 followed by a de-rated section of pipeline and riser 12 that delivers produced fluids to the production facility 14. As shown in FIG. 1, immediately downstream of the HIPPS 6 is the fortified section, also referred to as a "fortified zone" 8, to protect the flowline and other equipment immediately downstream of the HIPPS 6 from rapid pressure increases which can occur as fluid passes through the HIPPS valves during the valve closure process. This is necessary since closure of the HIPPS valve is not instantaneous. The length of the fortified zone needed is based on the reaction time of the HIPPS valve when closing. This fortified zone 8 must be rated to full SITP in order to withstand the transient build-up pressure in case there is a blockage along the line. A fortified zone having a shorter length would be desirable since the fortified zone entails thick, heavy pipe walls, more complex fabrication and more onerous installation methods.

Despite the benefits offered by HIPPS technology, there remain drawbacks to HIPPS that have not successfully been addressed to date and are particularly prominent in oil-producing systems. For one thing, the faster the required closure time of the HIPPS valve, the more complex the HIPPS system needs to be in order to achieve rapid closure with the necessary extremely high degree of reliability. The HIPPS valve must close before the system pressure rises above the design pressure at the end of the subsea fortified zone 8. For another thing, the length of the fortified zone 8 that is required using known technology can often result in high cost and complex design, fabrication and installation requirements.

It would be desirable to have an improved method and system for preventing overpressurization of subsea equipment and flowlines, i.e., thereby lessening pressure increase, in a simpler, less costly way. It would further be desirable to have a technology that would allow the length of the fortified zone to be reduced, enabling the use of lower cost pipeline, as well as simpler welding, manufacturing and installation requirements. It would also be desirable to have a technology that would allow the required closure time of the HIPPS valve to be lengthened, thereby reducing cost and complexity of the HIPPS valve(s).

SUMMARY

In one aspect, a method is provided for preventing overpressurization of piping for transporting fluid produced from a pressure source to a receiving facility wherein the fluid is directed from the pressure source through the piping to a high integrity pressure protection system (HIPPS). The HIPPS includes a pressure sensor, a valve and a control system for detecting a pressure surge in the piping greater than a HIPPS shut-in pressure and for closing the valve over a valve closure time period to shut off flow in the piping in response to the pressure surge. The piping has a fortified zone extending a distance downstream of the HIPPS to contain transient pressure build up during HIPPS valve closure time. A relief device in the piping is in fluid communication with the HIPPS. The relief device is configured such that, in the event that the fluid passing through the HIPPS during the valve closure time period has a property exceeding a relief device activation property, the relief device is activated thus allowing the fluid passing through the HIPPS during the valve closure time period to flow to a fluid containment volume in fluid communication with the HIPPS. The fluid containment volume has sufficient volume such that upon the start of the closure of the valve in response to the pressure surge, a portion of the fluid passing through the HIPPS during the valve closure time period is absorbed by the fluid containment volume thereby lessening the pressure increase in the piping.

In one aspect, a system is provided for system for preventing overpressurization of piping for transporting fluid produced from a pressure source to a receiving facility wherein the fluid is directed from the pressure source through the piping to a HIPPS. The system includes a relief device in the piping in fluid communication with the HIPPS wherein the relief device is configured such that, in the event that the fluid passing through the HIPPS during the valve closure time period has a property exceeding a relief device activation property, the relief device is activated by allowing the fluid passing through the includes during the valve closure time period to flow to a fluid containment volume in fluid communication with the HIPPS. The system also includes the fluid containment volume in fluid communication with the HIPPS. The fluid containment volume has sufficient volume such that upon the start of the closure of the valve in response to the pressure surge, a portion of the fluid passing through the HIPPS during the valve closure time period is absorbed by the fluid containment volume thereby lessening the pressure increase in the piping.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Embodiments of processes and systems will now be described for preventing overpressurization of piping transporting fluid from a pressure source to a receiving facility.

As used herein, the terms "production facility," "receiving facility" and "facility" are used interchangeably to refer to facilities used for the production of oil and/or gas, including but not limited to one or more separators, treating and processing equipment, storage areas and tanks, and related facilities.

As used herein, the term "pressure source" may refer to any subsea source of fluid that may reach an elevated pressure, such as a subsea oil and gas producing well, a subsea pump, a subsea compressor, or the like.

By "elevated pressure" is meant a fluid pressure that is higher than a design fluid pressure for a given pipeline system or production facility. The fluid pressure may be at elevated pressure for a number of reasons, including but not limited to a blockage in the pipeline system downstream of the pressure source, a pressure surge from the pressure source, and a sudden unintended closure of a valve downstream in the pipeline system.

As used herein, the term "fluid" may refer to a gas, a liquid, a dense phase fluid and combinations thereof.

As used herein, the terms "piping," "flowline," and "pipeline" are used interchangeably to refer to pipe useful in transporting produced oil and gas from a pressure source to a production facility. Suitable pipe can include steel pipe, composite pipe and flexible pipe.

As used herein, the terms "high integrity pressure protection system" and "HIPPS" are used interchangeably to refer to a system for use in a section of piping that includes a pressure sensor, a valve and a control system for detecting a pressure surge in the piping greater than a HIPPS shut-in pressure and for closing the valve over a time period to shut off flow in the piping in response to the pressure surge.

As used herein, the terms "fortified piping zone," fortified pipeline zone," "fortified section" and "fortified zone" are used interchangeably to refer to piping that is rated for a maximum source pressure or shut-in pressure and having a length based on the reaction time of the HIPPS valve when closing and an associated pressure surge above a HIPPS activation pressure caused by excess fluid traveling through the HIPPS valve during closure and filling the finite volume of the downstream pipeline.

Figure 2:
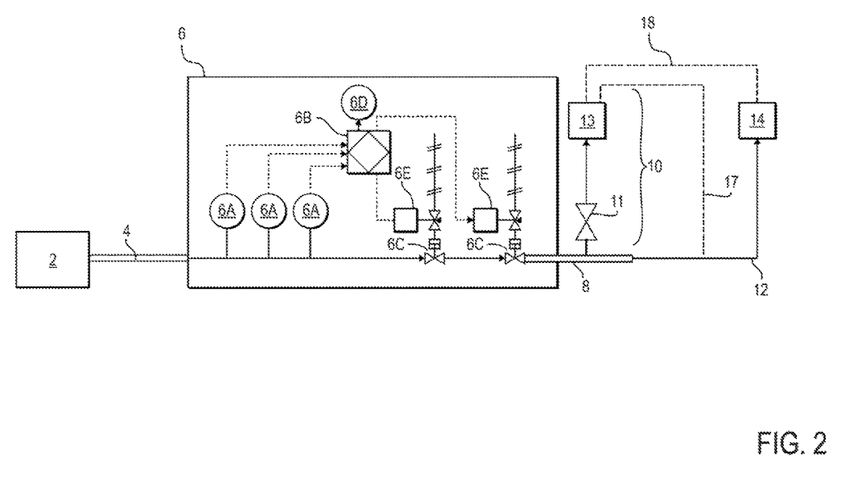
FIG. 2 is a schematic diagram illustrating an oil and gas production facility according to one exemplary embodiment.

In one embodiment, as shown in FIG. 2, a system is provided for preventing overpressurization of piping for transporting fluid produced from a pressure source 2 to a receiving facility 14. As in FIG. 1 described above, the offshore oil and gas production facility illustrated includes a drill center 2 having one or more subsea wells, also referred to herein as a pressure source 2, a fully rated section of pipeline 4 connecting the pressure source 2 to a HIPPS 6, a fortified section of pipeline 8 connected to the HIPPS 6 followed by a de-rated section of pipeline and riser 12 that delivers produced fluids to the production facility 14. Immediately downstream of the HIPPS 6 is the fortified section, also referred to as a "fortified zone" 8, to protect the flowline and other equipment immediately downstream of the HIPPS 6 from rapid pressure increases which can occur as fluid passes through the HIPPS valves during the valve closure process.

As shown in FIG. 2, the HIPPS 6 includes the known components of a HIPPS, including pressure sensors and transmitters 6A for measuring pressure and/or flow rate, and a logic solver 6B connected to the transmitters for determining whether an activation pressure or flow rate has been met. If the activation pressure or flow rate is met, an alarm 6D is typically activated, and the HIPPS valve(s) 6C is closed via the actuator 6E in communication with the logic solver 6B.

As shown in FIG. 2, a pressure surge relief system 10 is provided in the pipeline system in fluid communication with the HIPPS 6. The pressure surge relief system 10 includes a relief device represented symbolically by reference numeral 11 and a fluid containment volume represented symbolically by reference numeral 13 in communication with the relief device 11. The pressure surge relief system 10 is configured such that, in the event that the fluid passing through the HIPPS 6 during the valve closure time period has a fluid property that exceeds an activation property, the relief device 11 is activated, thereby allowing the fluid passing through the HIPPS 6 during the valve closure time period to flow to the fluid containment volume 13 in fluid communication with the HIPPS 6. The fluid containment volume 13 has sufficient volume such that, upon the start of the closure of the HIPPS valve 6C in response to the pressure surge, a portion of the fluid passing through the HIPPS 6 during the valve closure time period is absorbed by the fluid containment volume 13. As a result, pressure increase in the pipeline of the system downstream of the HIPPS 6 (e.g. including sections 8 and 12) is lessened. In other words, pressure surges or spikes in the pipeline system can be mitigated. Pressure increase or build-up in terms of magnitude and/or rate of pressure increase can be mitigated.

The relief device 11 acts quickly to relieve pressure in situations in which the system is at risk of an overpressurization event. Upon being deployed, the relief device 11 acts to redirect at least a portion of the flow through the system to the fluid containment volume 13. The relief device 11 can be located either downstream (as shown) or upstream of the HIPPS 6, depending on the specific application. In one embodiment, the relief device 11 is connected to existing piping for transporting fluid in an existing oil and gas production facility. In one embodiment, newly drilled high-pressure wells can be tied into an existing production facility either by subsea connection into the existing flowline system or by connection of a new flowline and riser system connecting to the production facility. In one embodiment, the relief device 11 is alternatively installed as part of a green field oil and gas production facility installation.

The relief device 11 can take any of a variety of forms. In one embodiment, the relief device 11 can be a relief valve, a pilot operated pressure relief valve, a balanced pressure relief valve, a rupture disc, or a combination thereof. In one embodiment, the relief device 11 can be a controlled valve, an electrically driven pump, a hydraulically driven pump, or a combination thereof. Each of these alternative forms is known and the exact method of implementing each in the disclosed embodiments would be apparent to one of ordinary skill in the art.

Figure 3:
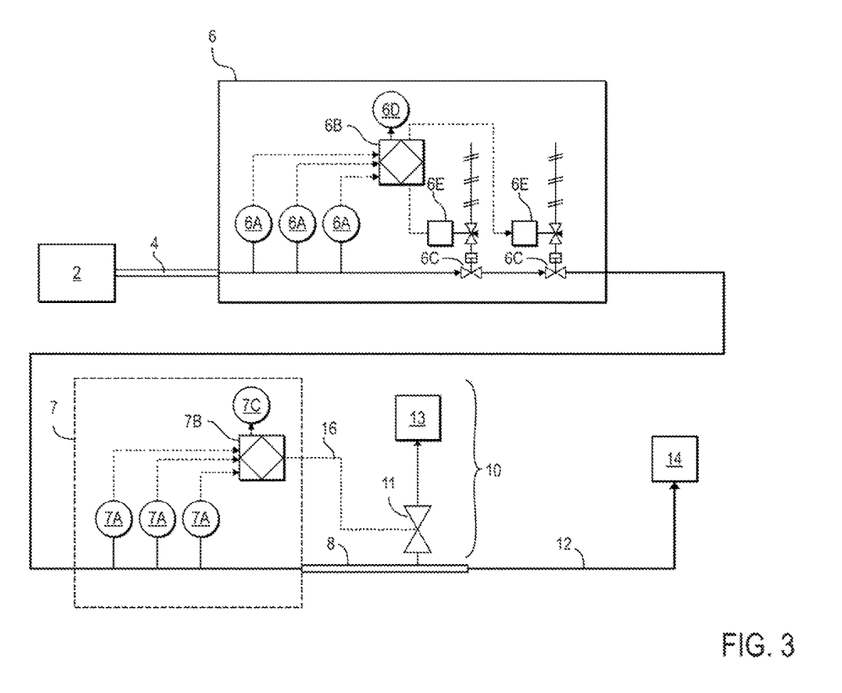
FIG. 3 is a schematic diagram illustrating an oil and gas production facility according to another exemplary embodiment.

In one embodiment as shown in FIG. 3, the relief device 11 can be connected to a relief device control system 7 including pressure or flow rate sensors and transmitters 7A and a logic controller 7B for determining whether to activate the relief device 11. The controller 7B activates the relief device 11 by sending a signal through line 16. An optional alarm 7C may also be provided.

In an alternate embodiment, the relief device 11 may have no control system, but rather may be automatically deployed when the pressure reaches a predetermined threshold as would be the case with a rupture disc for example.

Figure 4:
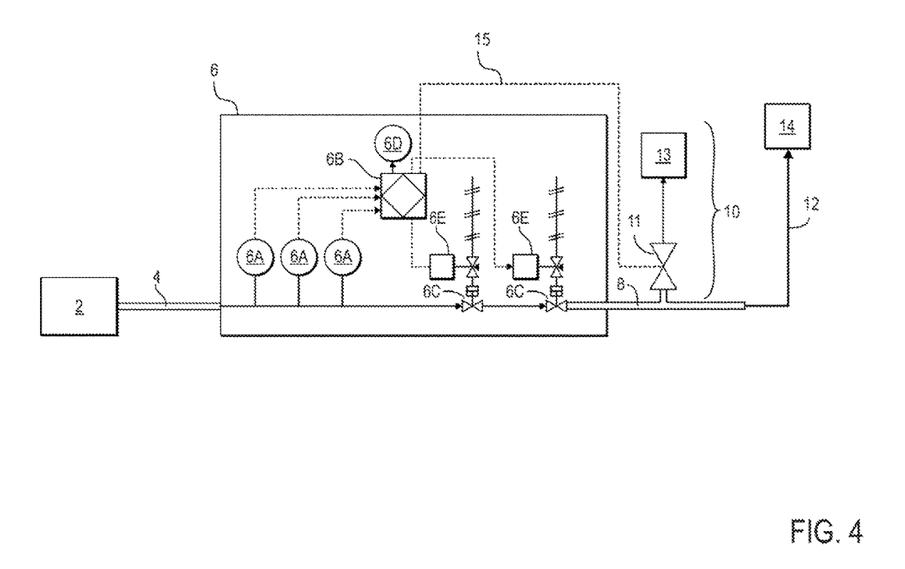
FIG. 4 is a schematic diagram illustrating an oil and gas production facility according to yet another exemplary embodiment.

The fluid property used as the activation property to activate the relief device 11 can be the pressure and/or flow rate of the fluid passing through the HIPPS 6. Therefore, in one embodiment, the property can be pressure which can be detected by a pressure sensor. The activation pressure in such case is pressure at or above the HIPPS activation pressure. Therefore the relief device 11 will be activated concurrently or immediately after the activation of the HIPPS valve 6C. Referring to FIG. 4, in one embodiment, the pressure sensor used to activate the relief device 11 can be the pressure sensor(s) 6A of the HIPPS 6. The pressure sensor(s) 6A sends a signal to the logic controller 6B that in turn determines whether to activate the relief device 11 in the event that the pressure of the fluid passing through the HIPPS 6 exceeds the relief device 11 activation pressure. The controller 6B activates the relief device 11 by sending a signal through line 15.

In one embodiment, the property used to activate the relief device 11 can be the flow rate of fluid flowing through the HIPPS 6. The flow rate can be detected by a flow rate sensor, similar to pressure sensor 6b, located within the HIPPS 6, or located upstream or downstream of the HIPPS 6. The flow rate sensor can activate the relief device in the event that the flow rate of the fluid passing through the HIPPS 6 exceeds the relief device activation flow rate.

The fluid containment volume 13 receives the redirected flow when the relief device 11 is activated, enabling the pressure within the pipeline system to be reduced. The fluid containment volume 13 can take any of a variety of forms. The fluid containment volume 13 can have a volume of from 0.1 barrel to 1000 barrels, even from 1 barrel to 100 barrels.

Figure 5A:
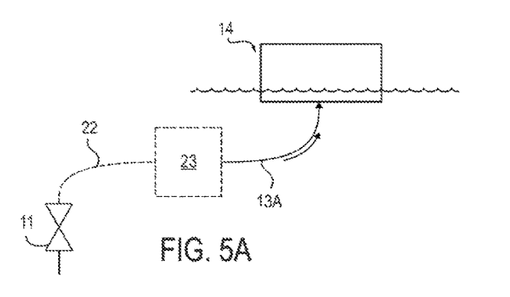
FIGS. 5A-5D and 6-13 illustrate nonlimiting alternative examples of fluid containment volumes for use in systems and methods disclosed herein.
Figure 5B:
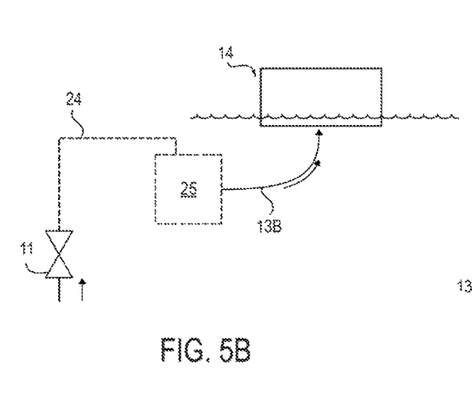
Figure 5C:
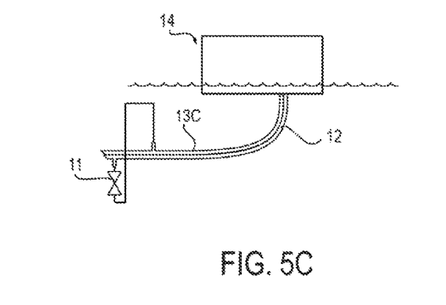
Figure 5D:
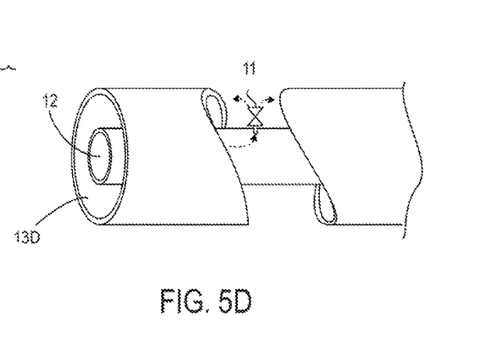

In a number of embodiments, the fluid containment volume 13 can be a section of line located between the HIPPS 6 and the receiving facility 14, as illustrated in FIGS. 5A-5D. As shown in FIG. 5A, fluid containment volume 13 can be a section of an umbilical 13A. In this embodiment, optional flying lead 22 and optional termination assembly 23 may also be provided between the relief device 11 and the umbilical 13A. As shown in FIG. 5B, fluid containment volume 13 can be a spare pipeline, a spare flowline, a functional test line, a functional kill line, a water injection line, a gas lift line, a chemical line, or a service line 13B. In this embodiment, optional jumper 24 and optional termination assembly or manifold 25 may also be provided between the relief device 11 and the line 13B. As shown in FIG. 5C, fluid containment volume 13 can be a section of piggyback pipe 13C mounted onto a larger diameter pipe which may be the main flowline. In this embodiment, the piggyback pipe 13C may not connect directly to the receiving facility 14 but rather provide a sufficient length of volume to contain fluid as needed. As shown in FIG. 5D, fluid containment volume 13 can be a flow channel 13D within a pipe-in-pipe flowline. As shown, the fluid containment volume is the annulus 13D and the main flowline 12 is the bore within the flowline.

Figure 6:
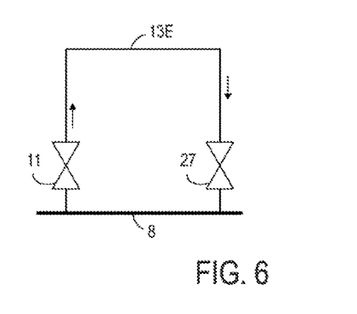

In one embodiment, as shown in FIG. 6, the fluid containment volume 13 can be a piping loop 13E in the fortified zone 8. A return valve 27 may be provided to control the return of fluid to the main flowline (or section of pipeline 12).

Figure 7:
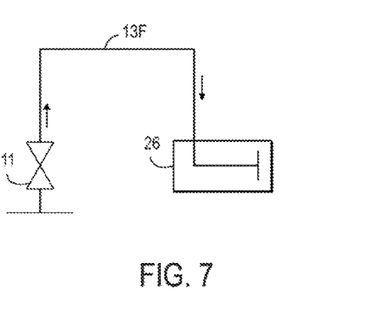

In one embodiment, as shown in FIG. 7, the fluid containment volume 13 can be a piping spool piece or a jumper 13F. A support or mat 26 can be provided to support one end of the spool piece 13F and to optionally provide access to the spool piece 13F for fluid removal.

Figure 8:
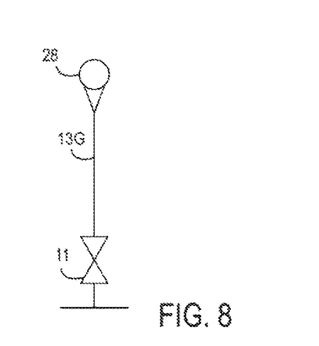

In one embodiment, as shown in FIG. 8, the fluid containment volume 13 can be a freestanding vertical spool 13G. The spool 13G can be held in a vertical position by attaching a buoyancy module 28 to an end thereof.

Figure 9:
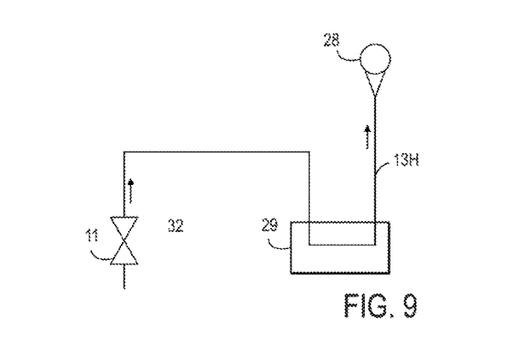

As shown in FIG. 9, fluid containment volume 13 can be a freestanding riser 13H supported vertically by a buoyancy module 28. An optional pipeline end termination or riser base 29 can also be provided between the relief device 11 and the riser 13H.

Figure 10:
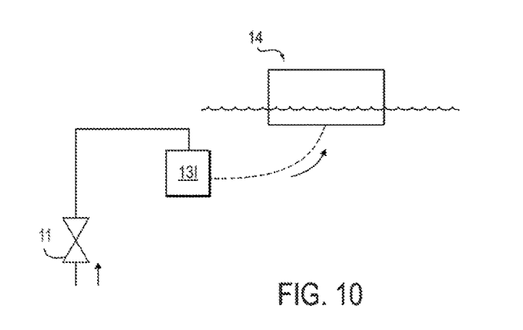
Figure 11:
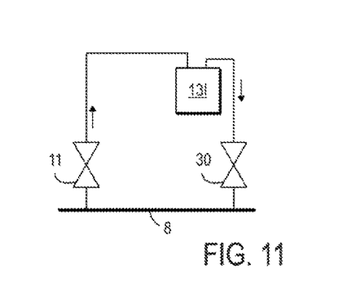

In one embodiment, as shown in FIG. 10, the fluid containment volume 13 can be a storage tank 13I, e.g., made from steel, composite material or an expandable membrane. In one embodiment, the storage tank 13I is connected to a relief system (not shown), e.g. a flare or a dump tank, located at the receiving facility 14. In one embodiment, the storage tank 13I is arranged as shown in FIG. 11 in parallel to the main flowline 8 and a return valve 30 is provided to control return of diverted fluid from the storage tank 13I to the flowline 8.

Figure 12:
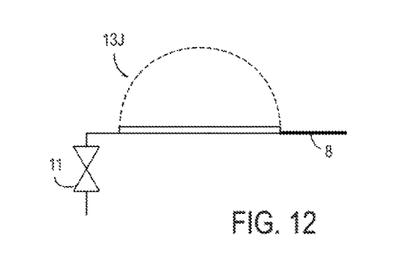

In one embodiment, as shown in FIG. 12, the fluid containment volume 13 can be a bladder 13J made from a flexible material having sufficient volume and flexibility to allow for expansion when the bladder is 13J filled or partially filled with liquid. In one embodiment, the bladder 13J is formed of a material that is strong, durable and has high puncture resistance and chemical resistance. For example, such material can include aramid fibers, graphene sheets or layers of sheets, nitrile rubber, neoprene, poly (vinyl chloride), polyurethane and combinations thereof.

Figure 13:
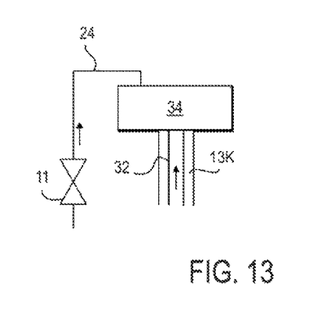

In one embodiment, as shown in FIG. 13, the fluid containment volume 13 can be a well annulus 13K in a subsea well having production tubing 32 extending within the well annulus 13K and having a subsea christmas tree 34 having valving to allow access to the well annulus. Once the fluid containment volume 13 is filled or partially filled, any of several alternative means of disposing the fluid are possible. In one embodiment, as shown in FIG. 2, fluid from the fluid containment volume can be returned to the piping through optional return line 17. One embodiment, fluid from the fluid containment volume can be flowed directly to the receiving facility through optional line 18. In one embodiment, fluid from the fluid containment volume can be recovered with the use of a remotely operated vehicle or a diver (not shown). In one embodiment, the fluid containment volume itself can be recovered to a topsides facility.

In one embodiment, the pipeline exiting the HIPPS 6 consists of an initial fortified zone 8, also referred to as a fortified piping zone 8, followed by a combined section of de-rated pipeline and riser 12 between the fortified zone 8 and the production facility 14. Thus, fluid having passed through the HIPPS valve 6C during closing of the valve is directed through the fortified zone 8 and subsequently directed through the de-rated piping and riser 12. Advantageously, the system of the present disclosure enables the use of a shorter (i.e., reduced length) fortified zone 8 and longer length of de-rated piping 12, thus simplifying installation and reducing cost of the piping between the HIPPS 6 and the production facility 14.

Advantageously, the system of the present disclosure also enables the use of a longer (i.e., increased) closure time of the HIPPS valve 6C, thus simplifying the design and reducing the cost of the HIPPS valve 6C. The use of a longer closure time of the HIPPS valve 6C can be implemented separately from, or in combination with, the shorter fortified zone 8.

In many cases, fluid produced from the pressure source 2 drops in pressure over a production time period. For instance, wellhead pressure may be very high early in the life of the well, necessitating the use of a HIPPS 6 and the pressure surge relief system disclosed herein, but the pressure can then drop significantly to below the de-rated design pressure of the non-fortified zone 12 as the reservoir 2 is drained. In one embodiment, after such a pressure drop, the system as disclosed herein can be disconnected from the piping between the pressure source 2 and the production facility 14, when it is no longer needed to prevent overpressurization caused by pressure surges from the pressure source. In such case, the HIPPS 6 can be disconnected from the piping section 4, thereby disconnecting the HIPPS 6, the relief device 11 and the fluid containment volume 13 together as one assembly. This assembly 6, 11, 13 can then be removed. The assembly 6, 11, 13 can be replaced with a spool piece or a jumper. Once the assembly 6, 11, 13 is removed, it can be redeployed at a different location where it is needed to prevent overpressurization caused by pressure surges from a different pressure source. Alternatively, the HIPPS 6, the relief device 11 and the fluid containment volume 13 can be disconnected individually and removed separately.

It should be noted that only the components relevant to the disclosure are shown in the figures, and that many other components normally part of a subsea oil and gas production facility and a HIPPS are not shown for simplicity.

EXAMPLES

Figure 14:
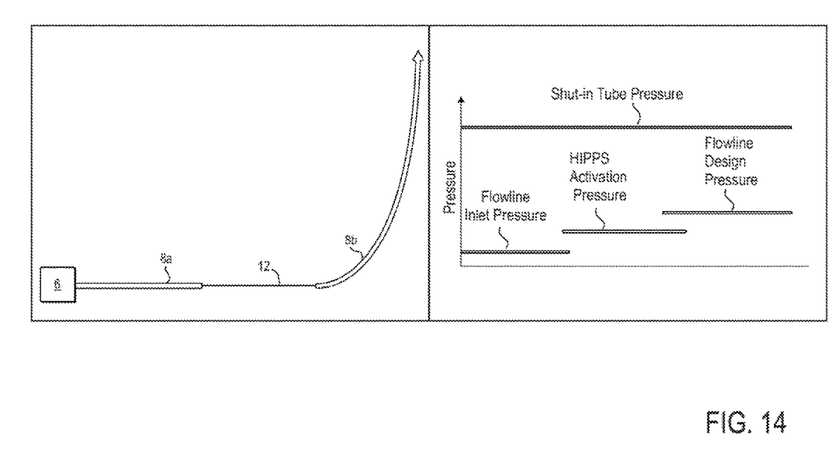
FIG. 14 is a schematic diagram illustrating an oil and gas production facility simulated herein.

A subsea pipeline system including 10 mi. long, dual 8-in flowlines connecting a high pressure drill center (not shown) to a production facility (not shown) in 5000 ft deep water (i.e., having a riser 5000 ft in height) with a throughput of approximately 40,000 bbl/day was simulated and analyzed using OLGA modeling software (commercially available from Schlumberger, Houston, Tex.). The layout of the system is shown in FIG. 14 in which the HIPPS 6 is located upstream of the flowline inlet (directly downstream of the HIPPS) and two fortified zones 8a and 8b. Fortified zone 8a is located adjacent to the HIPPS 6, and fortified zone 8b is located downstream of a de-rated flowline section 12 and includes the riser.

The fortified zones 8a and 8b are fully rated for shut-in pressure and provide a safeguard to contain pressure rise to shut-in level between the HIPPS 6 and a potential subsea pipeline blockage, before the HIPPS valves are closed. The pipeline simulated was assumed to be normally operated at 6 ksi and designed for 12.8 ksi. The HIPPS valves were assumed to begin to close when the pressure at the flowline inlet reaches 10 ksi, e.g., when a blockage occurs downstream of the HIPPS causing the pressure in the section between the HIPPS and the blockage to increase. The HIPPS valves are closed in 5 to 15 seconds according to the assumed design setting.

FIG. 14 also includes a plot showing the key pressure envelopes relative to one another used for the system design. The flowline inlet pressure (normal operating condition) was assumed to be around 6 ksi at the wellhead. The well shut-in tubing pressure was assumed to be 17.8 ksi. The HIPPS 6 was configured to activate, i.e., shut off flow, at a HIPPS activation pressure set point of 10 ksi. The flowline design pressure was assumed to be slightly above the HIPPS trip point at 12.8 ksi, much lower than shut-in tubing pressure. The large difference between the flowline design pressure and the shut-in tubing pressure enables a simpler and less onerous flowline section design in that the wall thickness used for the 8 in nominal outside diameter flowline rated to 12.8 ksi can be 1.371 in vs. 1.754 in for the full SITP of 17.8 ksi.

Comparative Example

Figure 15:
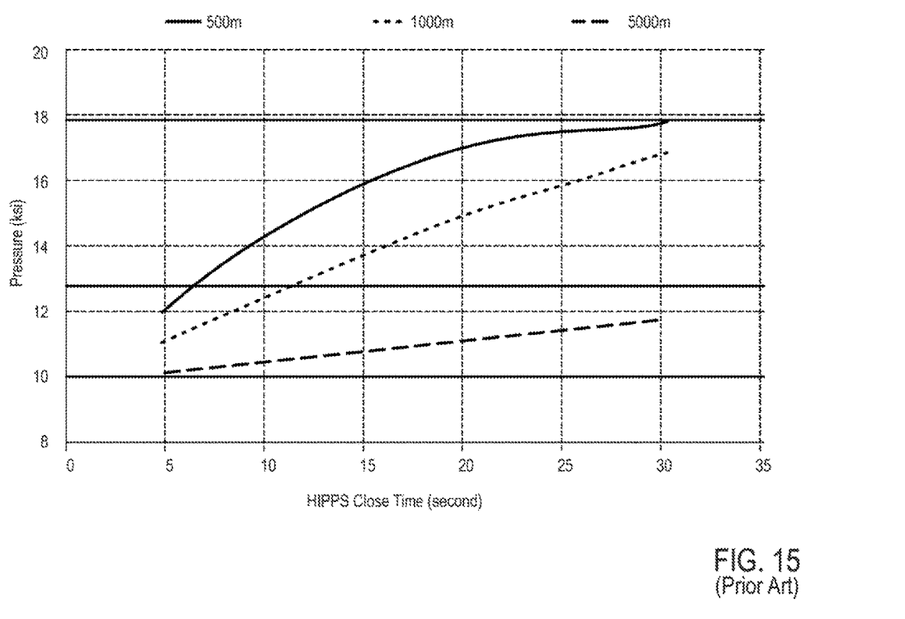
FIGS. 15-17 are plots of pressure vs. HIPPS valve closure time based on simulations herein.

FIG. 15 shows the relationship between the pressure in the pipeline system (in ksi) and the closure time of the HIPPS valve (in seconds) for a system as shown in FIG. 14, utilizing conventional technology according to the prior art for three different lengths of fortified zone 8a, 500 m, 1000 m and 5000 m. As shown, assuming a blockage occurs 500 m downstream of the HIPPS in this scenario, if the HIPPS valve closes in 5 seconds, the pressure at a location 500 m downstream of the HIPPS reaches 12 ksi. Since the pipeline is designed for 12.8 ksi, only this 500 m section of pipeline needs to be designed for thicker wall (fortified zone). If the valve closes in 10 seconds, the pressure at the 500 m location reaches 14 ksi. Therefore in this scenario the length of the fortified zone required will be greater than 500 m. As shown in FIG. 15, in this simulation, the HIPPS closure time is 10 seconds, which correlates to a fortified zone length requirement of around 1000 m.

Example 1

Figure 16:
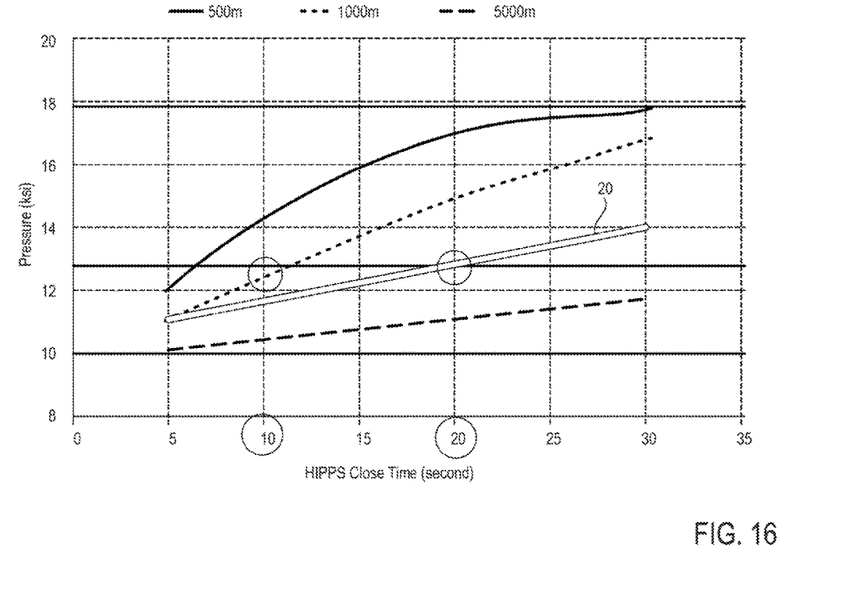

FIG. 16 shows the relationship between pipeline pressure and the closure time of the HIPPS valve 6C for three different lengths of fortified zone 8a as shown in FIG. 14, with the addition of a line 20 representing the relationship between the closure time of the HIPPS valve and the corresponding length required of the fortified zone 8a when the methods and systems of the present disclosure are utilized as in FIG. 2. Line 20 illustrates the behavior of the system in one hypothetical scenario using embodiments of the present invention. The actual slope of line 20 will vary depending on the specific design and the fluid containment volume of the system. However, in all cases, use of embodiments of the present invention will result in an improvement in the possible closure time of the HIPPS valve while maintaining an extremely high degree of reliability. In other words, the closure time of the HIPPS valve becomes less critical, and can be longer than in conventional systems. Using the invention, the pressure in the pipeline section between the HIPPS and the blockage location increases more slowly than in the system shown in FIG. 14 or FIG. 1 (comparative). As can be seen in FIG. 16, a slower, 20 s HIPPS valve closure time can be enabled for an equivalent fortified zone length of 1000 m versus the 10 s valve closure time in the system shown in FIG. 5 without the use of the invention. When a blockage occurs at 1000 m downstream of the HIPPS, pressure reaches 12.8 ksi at a valve closure time of 20 s using the invention, as compared with 11 s in the comparative case.

Example 2

Figure 17:
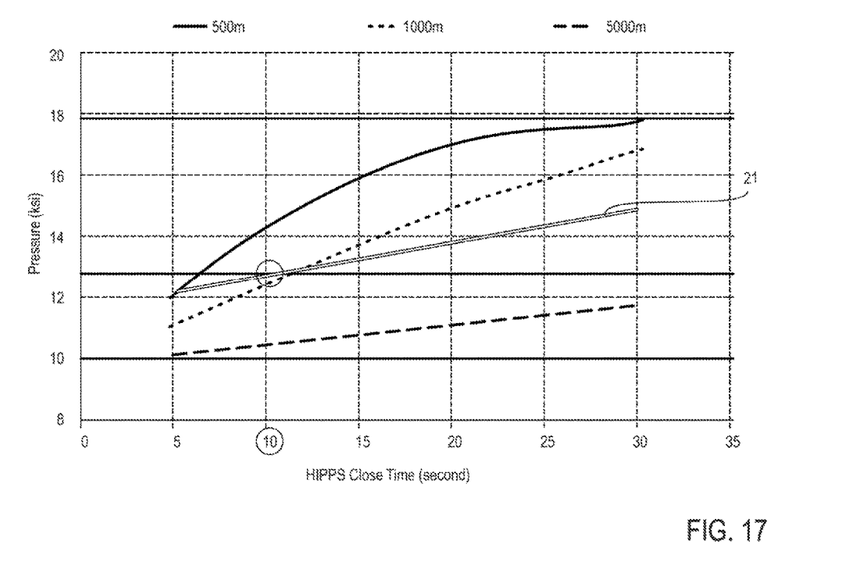

FIG. 17 again shows the relationship between pipeline pressure and the closure time of the HIPPS valve for three different lengths of fortified zone 8a as shown in FIG. 14, with the addition of a line 21 representing the relationship between the closure time of the HIPPS valve and the corresponding length required of the fortified zone 8a when the methods and systems of the present disclosure are utilized as in FIG. 2. Line 21 illustrates the behavior of the system using embodiments of the present invention in one hypothetical scenario. In all cases, use of embodiments of the present invention will result in an improvement in the possible length of the fortified zone 8a while maintaining an extremely high degree of reliability. In other words, the length of the fortified zone 8a becomes less critical using the system of the invention, and can be shorter in length than in conventional systems. This is an advantage as the shorter the fortified zone, the less expensive the pipeline is, and the less complex and demanding the welding and manufacturing qualification requirements are. Using embodiments of the invention, the pressure in the pipeline section between the HIPPS and the blockage increases more slowly than in the system shown in FIG. 14 or FIG. 1 (comparative). As can be seen in FIG. 17, since the pressure increase occurs more slowly (the curve is flatter), if the HIPPS valve closes in 10 seconds, the pressure at 500 m downstream of the HIPPS is lowered to 12.8 ksi. Therefore, the fortified zone length can be 500 m instead of 1000 m in the comparative case for equivalent performance. Therefore, as can be seen, the invention can be used to enable a shorter fortified zone length for an equivalent HIPPS design closure time.

Figure 18:
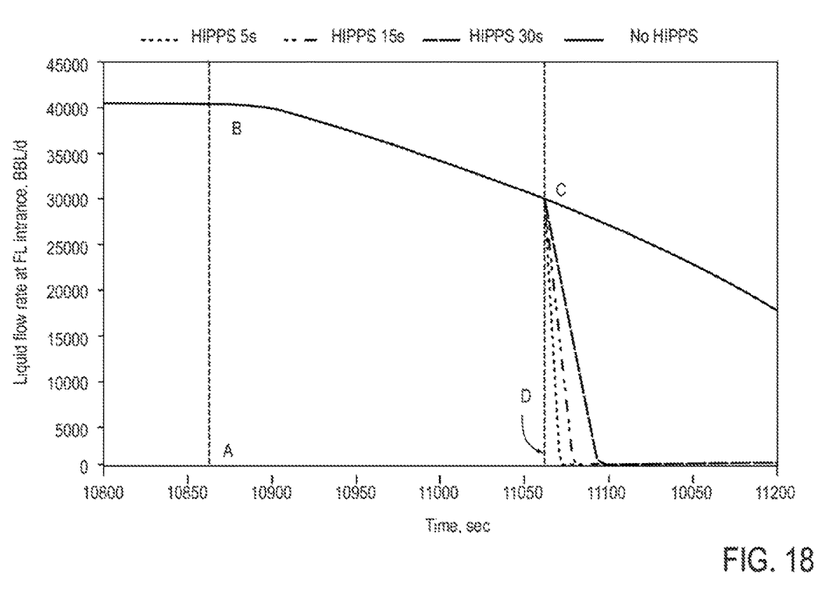
FIG. 18 is a plot of liquid flow rate at a flowline entrance vs. time in an overpressure and subsequent valve closure based on simulations herein.

In this example, the maximum volume of fluid required to be relieved from the flowline ranges from about 3 to 7 bbl, depending on the HIPPS valve closure time. FIG. 18 shows the flowrate of fluid entering the flowline immediately downstream of the HIPPS versus time during an overpressure and resulting HIPPS activation event for three different HIPPS valve closure times, assuming a blockage at the top of the riser. FIG. 18 was generated using OLGA flow assurance modeling software, assuming flowing conditions and a blockage (stopping flow) initiated at the top of the riser. HIPPS is assumed to be activated at 10 ksi pressure, shutting off additional flow over the stated closure times. The top of riser blockage scenario is a conservative approach, as less fluid enters the flowline in cases where the blockage occurs closer to the HIPPS. As shown in FIG. 18, most of the excess fluid enters the flowline before the HIPPS valve is activated. This is the volume entering the flowline indicated by the area under the curve, i.e., represented by points ABCD and equivalent to approximately 110 bbl. This volume of fluid filling the flowline increases the flowline pressure from normal operating pressure of 6 ksi to the HIPPS activation pressure of 10 ksi. Once the HIPPS valve is activated, depending on the valve closure time, comparatively little fluid passes through the valve into the flowline. The approximate amount of accumulated liquid for a range of HIPPS valve closure times is shown in Table 1 below, ranging from 3 to 7 bbl.

TABLE 1

| HIPPS closure time (s) | Total accumulated liquid after blockage (bbl) | Accumulated liquid after HIPPS activation (bbl) |
|---|---|---|
| 5 | 113 | 3 |
| 10 | 113.5 | 3.5 |
| 15 | 114 | 4 |
| 20 | 115 | 5 |
| 25 | 116 | 6 |
| 30 | 117 | 7 |

A conservatively sized fluid containment volume would be required to receive a volume equal to the amount of liquid accumulated after a HIPPS activation to avoiding filling the line and increasing the pressure undesirably quickly. Table 2 summarizes the required relief container volume for a range of HIPPS valve closure times. Also included in Table 2 is a comparison to the equivalent length of 8" nominal OD flowline piping and the dimensions of an equivalent cube-shaped container.

TABLE 2

| HIPPS closure time (s) | Accumulated liquid after HIPPS activation (bbl) | Volume (ft³) | Equivalent length 8" pipe (assume 5.721" ID) (ft) | Cube volume dimensions (ft³) |
|---|---|---|---|---|
| 5 | 3 | 16.8 | 94.4 | 2.6 |
| 10 | 3.5 | 19.7 | 110.1 | 2.7 |
| 15 | 4 | 22.5 | 125.8 | 2.8 |
| 20 | 5 | 28.1 | 157.3 | 3.0 |

TABLE 2-continued

| HIPPS closure time (s) | Accumulated liquid after HIPPS activation (bbl) | Volume (ft³) | Equivalent length 8" pipe (assume 5.721" ID) (ft) | Cube volume dimensions (ft³) |
|---|---|---|---|---|
| 25 | 6 | 33.7 | 188.7 | 3.2 |
| 30 | 7 | 39.3 | 220.2 | 3.4 |

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A process for preventing overpressurization of piping for transporting fluid produced from a pressure source to a receiving facility wherein the fluid is directed from the pressure source through the piping to a high integrity pressure protection system comprising a pressure sensor, a valve and a control system for detecting a pressure surge in the piping greater than a high integrity pressure protection system activation pressure and for closing the valve over a valve closure time period having a start of a closure to shut off flow in the piping in response to the pressure surge, the process comprising:

providing a relief device in the piping in fluid communication with the high integrity pressure protection system wherein the relief device is configured such that, in the event that the fluid passing through the high integrity pressure protection system during the valve closure time period has a property exceeding a relief device activation property, the relief device is activated thereby allowing the fluid passing through the high integrity pressure protection system during the valve closure time period to flow to a fluid containment volume in fluid communication with the high integrity pressure protection system;

wherein the fluid containment volume has sufficient volume such that upon the start of the closure of the valve in response to the pressure surge, a portion of the fluid passing through the high integrity pressure protection system during the valve closure time period is absorbed by the fluid containment volume thereby lessening pressure increase in the piping;

wherein the property is pressure and a relief device activation pressure is at or above a high integrity pressure protection system shut-in pressure.

2. The process of claim 1, wherein the relief device is downstream of the high integrity pressure protection system.

3. The process of claim 1, wherein the relief device is upstream of the high integrity pressure protection system.

4. The process of claim 1, wherein the pressure sensor of the high integrity pressure protection system detects the fluid pressure passing through the high integrity pressure protection system and activates the relief device in the event that the pressure of the fluid passing through the high integrity pressure protection system exceeds the relief device activation pressure.

5. The process of claim 1, wherein the fluid containment volume has a volume of from 0.1 barrel to 1000 barrels.

6. The process of claim 1, wherein fluid having passed through the valve during closing of the valve is directed through a fortified piping zone comprising piping rated for maximum source pressure or shut-in pressure and is subsequently directed through de-rated piping to the receiving facility.

7. The process of claim 1, further comprising connecting the relief device to an existing oil and gas production facility comprising existing piping for transporting fluid.

8. The process of claim 1, further comprising returning fluid from the fluid containment volume to the piping.

9. The process of claim 1, further comprising flowing fluid from the fluid containment volume to the receiving facility.

10. The process of claim 1, further comprising, after the fluid produced from the pressure source has dropped in pressure over a production period, disconnecting the high integrity pressure protection system, the relief device and the fluid containment volume from the piping; removing the high integrity pressure protection system, the relief device and the fluid containment volume; and replacing the removed high integrity pressure protection system with a spool piece or a jumper.

11. A system for preventing overpressurization of piping for transporting fluid produced from a pressure source to a receiving facility wherein the fluid is directed from the pressure source through the piping to a high integrity pressure protection system comprising a pressure sensor, a valve and a control system for detecting a pressure surge in the piping greater than a high integrity pressure protection system activation pressure and for closing the valve over a valve closure time period having a start of a closure to shut off flow in the piping in response to the pressure surge, the system comprising:

a relief device in the piping in fluid communication with the high integrity pressure protection system wherein the relief device is configured such that, in the event that the fluid passing through the high integrity pressure protection system during the valve closure time period has a property exceeding a relief device activation property, the relief device is activated thereby allowing the fluid passing through the high integrity pressure protection system during the valve closure time period to flow to a fluid containment volume in fluid communication with the high integrity pressure protection system; and a fluid containment volume in fluid communication with the high integrity pressure protection system, wherein the fluid containment volume has sufficient volume such that upon the start of the closure of the valve in response to the pressure surge, a portion of the fluid passing through the high integrity pressure protection system during the valve closure time period is absorbed by the fluid containment volume thereby lessening pressure increase in the piping;

wherein the property is pressure and a relief device activation pressure is at or above a high integrity pressure protection system shut-in pressure.

12. The system of claim 11, wherein the relief device is downstream of the high integrity pressure protection system.

13. The system of claim 11, wherein the relief device is upstream of the high integrity pressure protection system.

14. The system of claim 11, wherein the pressure sensor of the high integrity pressure protection system detects the fluid pressure passing through the high integrity pressure protection system and activates the relief device in the event that the pressure of the fluid passing through the high integrity pressure protection system exceeds the relief device activation pressure.

15. The system of claim 11, wherein the relief device is selected from the group consisting of a relief valve, a pilot operated pressure relief valve, a balanced pressure relief valve, a rupture disc, and combinations thereof.

16. The system of claim 11, wherein the relief device is selected from the group consisting of a controlled valve, an electrically driven pump, a hydraulically driven pump, and combinations thereof.

17. The system of claim 16, wherein the relief device is connected to a relief device control system.

18. The system of claim 16, wherein the relief device is connected to a high integrity pressure protection system control system associated with the high integrity pressure protection system.

19. The system of claim 11, wherein the fluid containment volume has a volume of from 0.1 barrel to 1000 barrels.

20. The system of claim 11, wherein the fluid containment volume comprises a section of line located between the high integrity pressure protection system and the receiving facility wherein the section of line is selected from the group consisting of a section of pipeline, a functional test line, a functional kill line, an umbilical tubing, a water injection line, a gas lift line, a chemical line, and a service line.

21. The system of claim 11, wherein the fluid containment volume is selected from the group consisting of a piping loop, a piping spool piece, and a jumper.

22. The system of claim 11, wherein the fluid containment volume comprises a storage tank.

23. The system of claim 11, further comprising a fortified piping zone comprising piping rated for maximum source pressure or shut-in pressure connected to the high integrity pressure protection system and de-rated piping connected to the fortified piping zone and the receiving facility.

24. The system of claim 11, further comprising a return line connecting the fluid containment volume and the piping for returning fluid from the fluid containment volume to the piping.

25. The system of claim 11, further comprising a line connecting the fluid containment volume and the receiving facility for flowing fluid from the fluid containment volume to the receiving facility.

* * * * *